Oct. 19, 1926. Re. 16,440

A. V. DELL

EGG CASE

Original Filed July 10, 1920 2 Sheets-Sheet 1

INVENTOR.
Arthur V. Dell
Charles W. Hills
BY ATTYS.

Oct. 19, 1926. Re. 16,440

A. V. DELL

EGG CASE

Original Filed July 10, 1920 2 Sheets-Sheet 2

INVENTOR.
Arthur V. Dell
Charles W. Hill
BY ATTYS.

Reissued Oct. 19, 1926. Re. 16,440

UNITED STATES PATENT OFFICE.

ARTHUR V. DELL, OF ROYAL OAK, MICHIGAN.

EGG CASE.

Original No. 1,441,722, dated January 9, 1923, Serial No. 395,271, filed July 10, 1920. Application for reissue filed January 5, 1925. Serial No. 719.

This invention relates particularly to egg cases used in shipping eggs from the producing centers to dealers or dealers to retailers, and my object is to devise a case which will more effectively protect the eggs than the cases now in use, so that the percentage of loss in transit is very greatly reduced and in which the capacity for any given dimensions is not materially reduced so that for equal capacity the improved case will be of but slightly greater length than the common thirty-dozen case.

I attain my object by means of the constructions hereinafter described and illustrated in the accompanying drawings in which—

Figure 3:
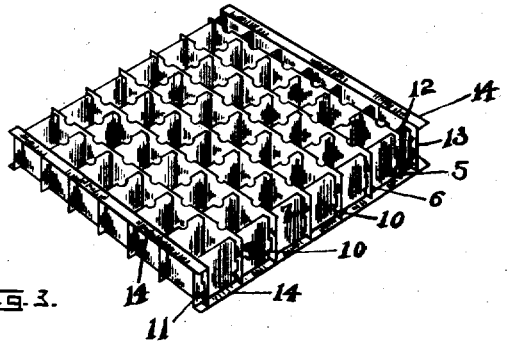

Fig. 3 a perspective detail of one of the fillers; and

Figure 4:
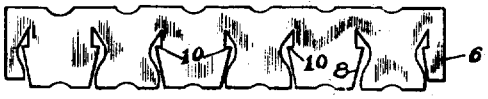
Figure 5:
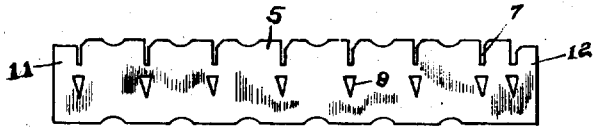

Figs. 4 and 5 side elevations of the strips forming the filler sections.

In the drawings like numerals of reference indicate corresponding parts in the different figures.

1 is a rectangular wooden box of ordinary construction provided with a lid 2 which is held in position when the case is closed by the hasps 3 of ordinary type.

As is usual in egg boxes, a plurality of superimposed fillers are employed and interposed flats 4 which, with the fillers, form rectangular cells to hold the eggs.

The fillers are each formed of a plurality of cardboard strips 5 and 6 (see particularly Figures 3, 4 and 5), the strips 5 being formed with notches 7 and the strips 6 with notches 8 which interlock as shown in Figure 3. The strips 5 are also provided with a series of holes 9 which engage the shoulders 10 formed on the sides of the notches 7 to hold the strips from accidental disengagement.

The fillers are so arranged that the cells in one are displaced in one direction so that the cells therein lie in staggered relationship to the cells in adjacent fillers, the cells of one filler having one set of strips of the underlying filler crossing said cells centrally and diametrically. As these strips would tend to give the flat overlying them almost too rigid a support, each strip which so crosses beneath the cells of a filler above it is cut out so that the flat can spring down slightly under the weight of the eggs contained therein, thus giving such eggs an elastic support. This arrangement makes the possibilities of breakage very much less than in the ordinary case in which eggs are supported in substantially axial alinement with one another and separated only by the flats.

Figure 1:
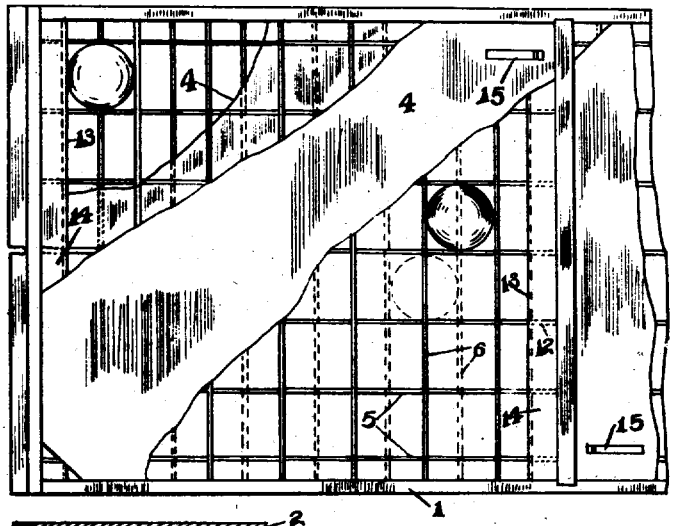
Fig. 1 is a plan view, partly broken away, of part of an egg case constructed in accordance with my invention.
Figure 2:
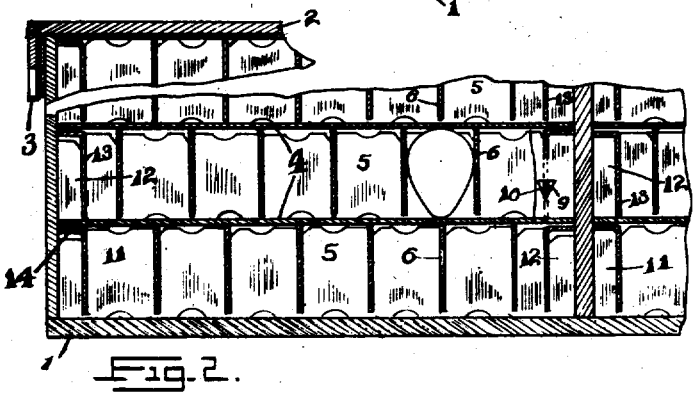
Fig. 2 is a vertical section of part of the same, partly broken away, showing the cover in place.

To secure this offsetting of alternate fillers and to give the fillers an elastic engagement with the sides of the box, I extend the ends of all the cardboard strips beyond the outer strip at each side. The ends 11 are comparatively short, but at one side the ends 12 are considerably longer, being of such length when the fillers are placed in position alternately in reversed positions the offsetting of the cells relative to one another is effected as shown particularly in Figs. 1 and 2 of the drawings. As these long ends 12 are easily bent, I interlock with them a bracing strip 13, the locking being effected preferably in the same manner as the interlocking between the strips 5 and 6.

A further protection against longitudinal or transverse shifting of the fillers is given by forming the outside cardboard strips of three sides and the bracing strip 13 on the fourth side with flanges 14 bent at right angles thereto, the width of said flanges being sufficient to bring their outer edges approximately into alinement with the outer edges of the strip ends which they cross.

As the successful operation of the case depends on the proper positioning of each filler, it is important, after a filler has been placed in position and filled with eggs and a flat inserted over it, to be able to determine at a glance at which side of the case the long ends 11 with their bracing strip are located in order that the next filler may be set in position with its corresponding ends diametrically opposite to the ends of the underlying filler. I therefore form in one corner of each flat an opening 15 through which the position of the underlying filler may be observed.

The waste of space due to the long ends 11 necessitates a slight increase in the size of the case above those commonly employed, but this is not found objectionable, though in cases where it is not desirable to increase the exterior dimensions of the case, full advantage of my invention may be obtained by reducing the capacity of the case, one row of cells in each flat in that case being dispensed with.

What I claim as my invention is:

1. A filler for egg cases, comprising interlocked members traversing each other at intervals to form cellular spaces, the outside members having lateral bracing flanges thereon extending away from the cellular structure, 2. A filler for egg cases, comprising interlocked members traversing each other at intervals to form cellular spaces, the ends of said members projecting beyond the cellular structure, the outside members having lateral bracing flanges thereon extending flush with the ends of their traversing members.

3. A filler for egg cases, comprising interlocked members traversing each other at intervals to form cellular spaces, the ends of said members projecting beyond the cellular structure, the projecting ends of one side being of greater length than the projecting ends of the other sides, and a strip interlocked with said longer ends and having a lateral bracing flange thereon extending away from the cellular structure to the ends of its interlocked members.

4. A filler for egg cases, comprising interlocked members traversing each other at intervals to form cellular spaces, the ends of said members projecting beyond the cellular structure, the projecting ends of one side being of greater length than the projecting ends of the other sides, a strip interlocked with said longer ends and having a lateral bracing flange thereon extending away from the cellular structure to the ends of its interlocked members, and lateral flanges on the outside members of the other sides extending to the ends of the members with which they are interlocked.

In testimony whereof I have hereunto subscribed my name.

ARTHUR V. DELL.